US009838884B2

(12) United States Patent
Kamimura

(10) Patent No.: US 9,838,884 B2
(45) Date of Patent: Dec. 5, 2017

(54) RADIO WAVE STATUS INDICATING APPARATUS, COMMUNICATION APPARATUS AND COMPUTER-READABLE MEDIUM

(71) Applicant: SoftBank Corp., Tokyo (JP)

(72) Inventor: Masayuki Kamimura, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 15/175,035

(22) Filed: Jun. 7, 2016

(65) Prior Publication Data

US 2016/0286406 A1 Sep. 29, 2016

Related U.S. Application Data

(63) Continuation of application No. PCT/JP2015/051057, filed on Jan. 16, 2015.

(30) Foreign Application Priority Data

Jan. 29, 2014 (JP) ................................ 2014-014283

(51) Int. Cl.
   *H04W 16/20* (2009.01)
   *H04B 17/318* (2015.01)
   (Continued)

(52) U.S. Cl.
   CPC .......... *H04W 16/20* (2013.01); *H04B 17/318* (2015.01); *H04W 24/10* (2013.01);
   (Continued)

(58) Field of Classification Search
   CPC ... H04W 16/20; H04W 24/10; H04W 64/003; H04W 16/18; H04B 17/318; H04B 17/27
   (Continued)

(56) References Cited

U.S. PATENT DOCUMENTS 6,963,731 B2 * 11/2005 Li et al. ................. H04B 17/00
                                                        455/67.7
2010/0323628 A1    12/2010 Shen et al.
(Continued)

FOREIGN PATENT DOCUMENTS

JP        2006-100884 A    4/2006
JP        2008-42628 A     2/2008
(Continued)

OTHER PUBLICATIONS

International Search Report for International Application No. PCT/JP2015/051057, issued by the Japan Patent Office dated Apr. 21, 2015.
(Continued)

*Primary Examiner* — Marisol Figueroa

(57) ABSTRACT

A radio wave status indicating apparatus is provided, the radio wave status indicating apparatus comprising: a radio wave intensity receiving unit that receives, from a communication apparatus, incoming radio wave intensity of the communication apparatus; a positional information acquiring unit that acquires positional information indicating a position of the communication apparatus; an expected value acquiring unit that acquires an expected value of incoming radio wave intensity at a position indicated by the positional information; a radio wave intensity comparing unit that compares the incoming radio wave intensity received by the radio wave intensity receiving unit with the expected value acquired by the expected value acquiring unit; and an indication information transmitting unit that transmits indication information based on a result of comparison by the radio wave intensity comparing unit to at least one of the communication apparatus and a communication terminal pre-registered in the communication apparatus.

14 Claims, 9 Drawing Sheets

(51) Int. Cl.
　　　*H04W 24/10*　　(2009.01)
　　　*H04W 64/00*　　(2009.01)
　　　*H04W 16/18*　　(2009.01)
　　　*H04B 17/27*　　(2015.01)

(52) U.S. Cl.
　　　CPC .......... *H04W 64/003* (2013.01); *H04B 17/27* (2015.01); *H04W 16/18* (2013.01)

(58) Field of Classification Search
　　　USPC ............................................ 455/456.1–457
　　　See application file for complete search history.

(56) References Cited

U.S. PATENT DOCUMENTS

| 2012/0188890 A1 | 7/2012 | Tabata |
| 2015/0162973 A1 | 6/2015 | Kamimura et al. |

FOREIGN PATENT DOCUMENTS

| JP | 2008-79226 A | 4/2008 |
| JP | 2009-135648 A | 6/2009 |
| JP | 2010-226668 A | 10/2010 |

OTHER PUBLICATIONS

International Preliminary Report on Patentability for International Application No. PCT/JP2015/051057 issued by the International Bureau of WIPO dated Aug. 11, 2016.

\* cited by examiner

RADIO WAVE STATUS INDICATING APPARATUS, COMMUNICATION APPARATUS AND COMPUTER-READABLE MEDIUM

The contents of the following Japanese and PCT application(s) are incorporated herein by reference:
2014-014283 filed in JP on Jan. 29, 2014; and
PCT/JP2015/051057 filed on Jan. 16, 2015

BACKGROUND

1. Technical Field

The present invention relates to a radio wave status indicating apparatus, a communication apparatus and a computer-readable medium.

2. Related Art

Mobile routers that acquire reception intensity of radio waves level-by-level (low, medium and high levels) have been known (for example, Patent Document 1).

PRIOR ART TECHNICAL DOCUMENTS

Patent Documents

[Patent Document 1] Japanese Patent Application Publication No. 2010-226668

For example, it has been desired to provide a system that assist, for example, in arrangement of a wireless router in a house at a position that achieves higher incoming radio wave intensity.

SUMMARY

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
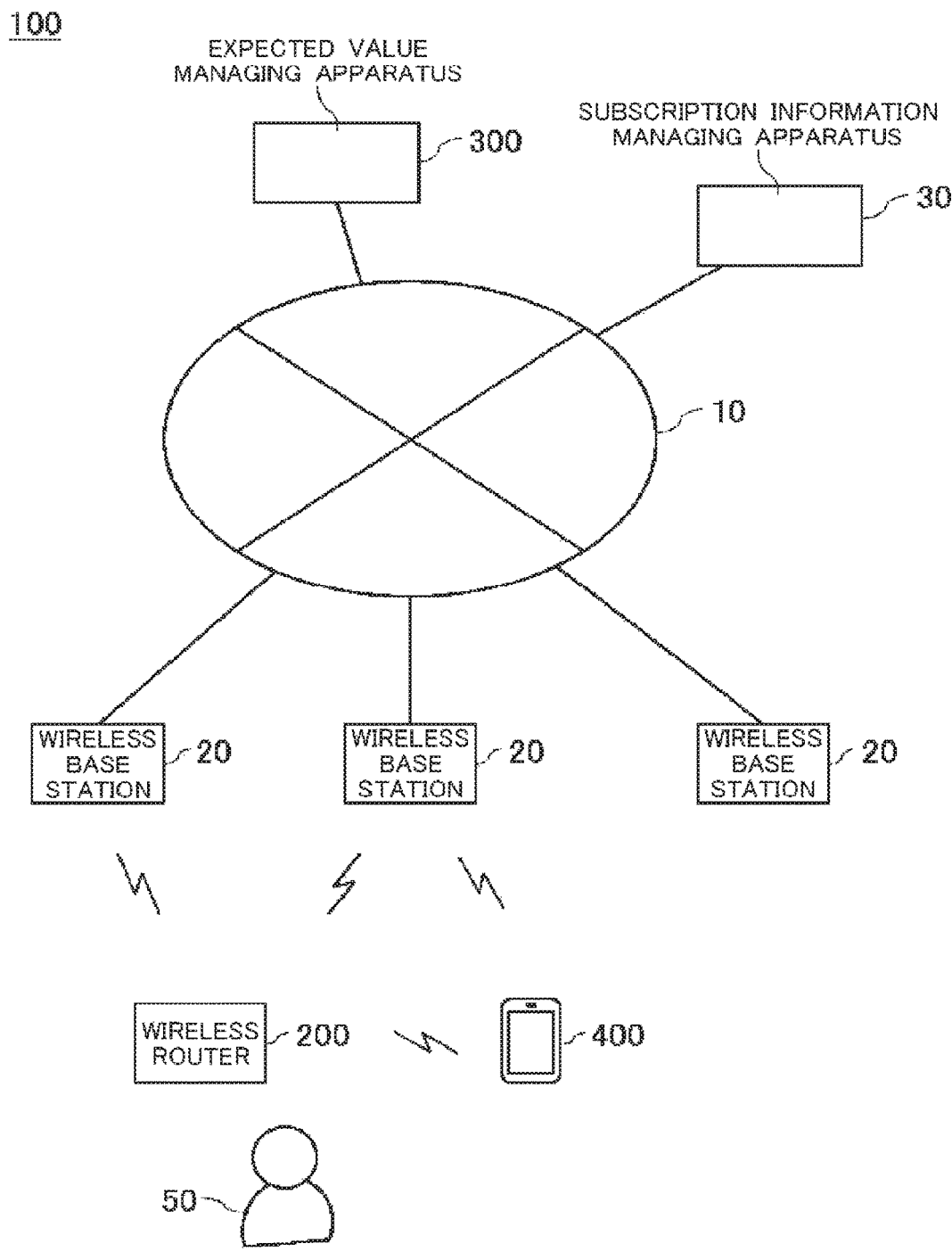
FIG. 1 schematically shows one example of a communication environment of a radio wave status indicating system.

FIG. 1 schematically shows one example of a communication environment of a radio wave status indicating system 100. The radio wave status indicating system 100 may include a wireless router 200, an expected value managing apparatus 300, a network 10, wireless base stations 20 and a subscription information managing apparatus 30. The wireless router 200 may be portable, and may be, for example, arranged in a house, an office or the like. The wireless router 200 may be one example of a communication apparatus. The expected value managing apparatus 300 may be one example of a radio wave status indicating apparatus.

The wireless router 200 communicates with the wireless base stations 20 in accordance with a first wireless communication system. The first wireless communication system is, for example, LTE (Long Term Evolution). Also, the first wireless communication system may be any of the third generation mobile communication system (3G), HSDPA (High Speed Downlink Packet Access) and mobile WiMAX.

Also, the wireless router 200 communicates with a communication terminal 400 in accordance with a second wireless communication system. The second wireless communication system is, for example, Wi-Fi (registered trademark). The second wireless communication system may be a wireless LAN other than Wi-Fi, or may be a near field wireless communication system such as Bluetooth (registered trademark).

The communication terminal 400 is equipment that can communicate with the wireless router 200, and is, for example, a mobile phone such as a smart phone, a tablet terminal, a PC (personal computer) or the like. The communication terminal 400 may communicate with the wireless base stations 20 in accordance with the first wireless communication system.

The wireless router 200 may communicate with the subscription information managing apparatus 30, the expected value managing apparatus 300 or the like via the wireless base stations 20 and the network 10. The network 10 may include a telephone network and the Internet.

The subscription information managing apparatus 30 manages subscription information about the wireless router 200. The subscription information may include the subscriber's name, address or the like of a subscriber 50 that has concluded a contract with a telecommunications carrier about the wireless router 200. The subscription information managing apparatus 30 manages, for example, router identification information identifying the wireless router 200 and the subscription information about the wireless router 200 in association with each other.

The expected value managing apparatus 300 manages expected values of incoming radio wave intensity at a plurality of points. The expected value managing apparatus 300, for example, acquires an expected value of incoming radio wave intensity at a specified position by referring to map data in which expected values of incoming radio wave intensity at respective ones among a plurality of points on a map are associated with the plurality of points. The map data may be generated and managed by a GIS (Geographic Information System).

The GIS may have three-dimensional map information, and information on radio wave status. The information on radio wave status includes, for example, the radio wave output and antenna type of the wireless base stations 20, the wireless coverage area of the wireless base stations 20, survey data of the incoming radio wave intensity at a plurality of points, connection ratio data at a plurality of points, addition information and removal information about the wireless base stations 20 or the like. Based on the three-dimensional map information and the information on a radio wave status, the GIS may generate and manage map data in which expected values of incoming radio wave intensity at respective ones among a plurality of points on a map are associated with the plurality of points. The expected value managing apparatus 300 may have the GIS. Also, another apparatus may have the GIS, and the expected value managing apparatus 300 may receive various types of data from the GIS that the other apparatus has.

The wireless router 200 according to the present embodiment may execute an indication process based on incoming radio wave intensity of radio waves received from the wireless base stations 20 and an expected value of incoming radio wave intensity at a position of the wireless router 200. The incoming radio wave intensity of radio waves received from the wireless base stations 20 may be incoming radio wave intensity of radio waves received from the wireless base stations 20 is in communication.

The wireless router 200 indicates, for example, measured incoming radio wave intensity and an expected value received from the expected value managing apparatus 300 together. Thereby, the subscriber 50 or the like can be allowed to know both current incoming radio wave intensity and an expected value.

Thanks to the wireless router 200 indicating measured incoming radio wave intensity, the subscriber 50 or the like can seek arrangement that achieves higher incoming radio wave intensity. When having found arrangement that achieves a certain degree of incoming radio wave intensity, the subscriber 50 will arrange the wireless router 200 at the location, but the subscriber 50 cannot notice, if any, a position that can achieve further higher incoming radio wave intensity. Accordingly, for example, in a house or the like, there are cases where communication at higher communication quality cannot be realized even if there is arrangement that achieves higher incoming radio wave intensity and such higher communication quality due to the fact the subscriber 50 or the like cannot notice it.

For a reason that a plurality of the wireless routers 200 are not arranged at positions that achieve optimum incoming radio wave intensity, the communication quality of the plurality of wireless routers 200 lowers. Even when the same data is to be received, communication takes a longer time when communication quality is low as compared with that when the communication quality is high. That is, because if the communication quality of the plurality of wireless routers 200 lowers, the length of time during which the plurality of wireless routers 200 occupy the communication band becomes longer, the overall communication efficiency lowers.

On the contrary, by using the wireless router 200 according to the present embodiment, an expected value of incoming radio wave intensity at a position of the wireless router 200 is indicated. Thereby, the subscriber 50 or the like can know that for example when incoming radio wave intensity is lower than an expected value, there is a possibility that the incoming radio wave intensity may be improved by moving the wireless router 200. Also, for example, the subscriber 50 can know that the wireless router 200 has been arranged at an appropriate position when incoming radio wave intensity is comparable to an expected value. In this manner, the possibility of arranging the wireless router 200 at a location that achieves higher incoming radio wave intensity can be improved by indicating an expected value to the subscriber 50 or the like, thus contributing to improvement of the overall communication efficiency.

The wireless router 200 may indicate the difference between measured incoming radio wave intensity and a received expected value. For example, the wireless router 200 indicates the ratio of incoming radio wave intensity to an expected value. Also, for example, the wireless router 200 indicates the difference between an expected value and incoming radio wave intensity. Thereby, the subscriber 50 can be allowed to know status about, for example, to what degree the incoming radio wave intensity is low in relation to the expected value.

Also, the wireless router 200 according to the present embodiment may execute an indication process according to indication information received from the expected value managing apparatus 300. For example, the expected value managing apparatus 300 transmits, to the wireless router 200, indication information based on a comparison result obtained by comparing incoming radio wave intensity of the wireless router 200 received from the wireless router 200 with an expected value of incoming radio wave intensity at a position indicated by positional information about the wireless router 200. Then, according to indication information received from the expected value managing apparatus 300, the wireless router 200, for example, indicates the incoming radio wave intensity and the expected value together or indicates the difference between the incoming radio wave intensity and the expected value. Thereby, the subscriber 50 can be allowed to know status about, for example, whether current incoming radio wave intensity is comparable to an expected value, and to what degree current incoming radio wave intensity is lower than an expected value.

The expected value managing apparatus 300 may receive, from the wireless router 200, positional information about the wireless router 200. For example, when the wireless router 200 has a GPS (Global Positioning System) function, the expected value managing apparatus 300 may receive, from the wireless router 200, GPS data as positional information about the wireless router 200.

Also, the expected value managing apparatus 300 may acquire, from subscription information about the wireless router 200 managed by the subscription information managing apparatus 30, positional information about the wireless router 200. For example the expected value managing apparatus 300 first receives router identification information from the wireless router 200. Next, the expected value managing apparatus 300 receives, from the subscription information managing apparatus 30, subscription information corresponding to the received router identification information. Then, the expected value managing apparatus 300 acquires, as positional information about the wireless router 200, an address included in the subscription information.

Also, the expected value managing apparatus 300 may acquire, as positional information about the wireless router 200, a wireless coverage area covered by the wireless base station 20 with which the wireless router 200 is in communication. For example, the expected value managing apparatus 300 first receives, from the wireless router 200, base station identification information identifying the wireless base station 20 with which the wireless router 200 is in communication. Next, the expected value managing apparatus 300 acquires, from a GIS or the like, a wireless coverage area of the wireless base station 20 identified by the received base station identification information. Then, the expected value managing apparatus 300 acquires, as positional information about the wireless router 200, the acquired wireless coverage area. Note that the expected value managing apparatus 300 may receive, from the wireless base station 20 identified by the base station identification information, positional information about the wireless router 200 estimated by the wireless base station 20.

Also, the expected value managing apparatus 300 may acquire positional information about the wireless router 200 based on base station identification information of the wireless base station 20 with which the wireless router 200 is in communication and subscription information received from the subscription information managing apparatus 30. For example, when an address included in subscription information is within a wireless coverage area covered by the wireless base station 20 identified by the base station identification information, the expected value managing apparatus 300 acquires the address as positional information about the wireless router 200. Also, when an address included in subscription information is not within a wireless coverage area covered by the wireless base station 20 identified by base station identification information, the expected value managing apparatus 300 does not handle the address as positional information about the wireless router 200, but acquires, as positional information, the wireless coverage area covered by the wireless base station 20.

Thereby, when the probability that the wireless router 200 is arranged at an address included in subscription information is high, the address can be acquired as positional information. Also, it is possible to prevent an address included in subscription information from being acquired as positional information about the wireless router 200 when the wireless router 200 is not arranged at the address.

The expected value managing apparatus 300 may transmit indication information to the communication terminal 400 pre-registered in the wireless router 200. The communication terminal 400 pre-registered in the wireless router 200 is for example a smart phone or the like used by the subscriber 50. The communication terminal 400 may execute an indication process according to indication information received from the expected value managing apparatus 300. Thereby, the subscriber 50 can be allowed to know, via the communication terminal 400, status about, for example, whether current incoming radio wave intensity of the wireless router 200 is comparable to an expected value, and to what degree the current incoming radio wave intensity is lower than the expected value.

Figure 2:
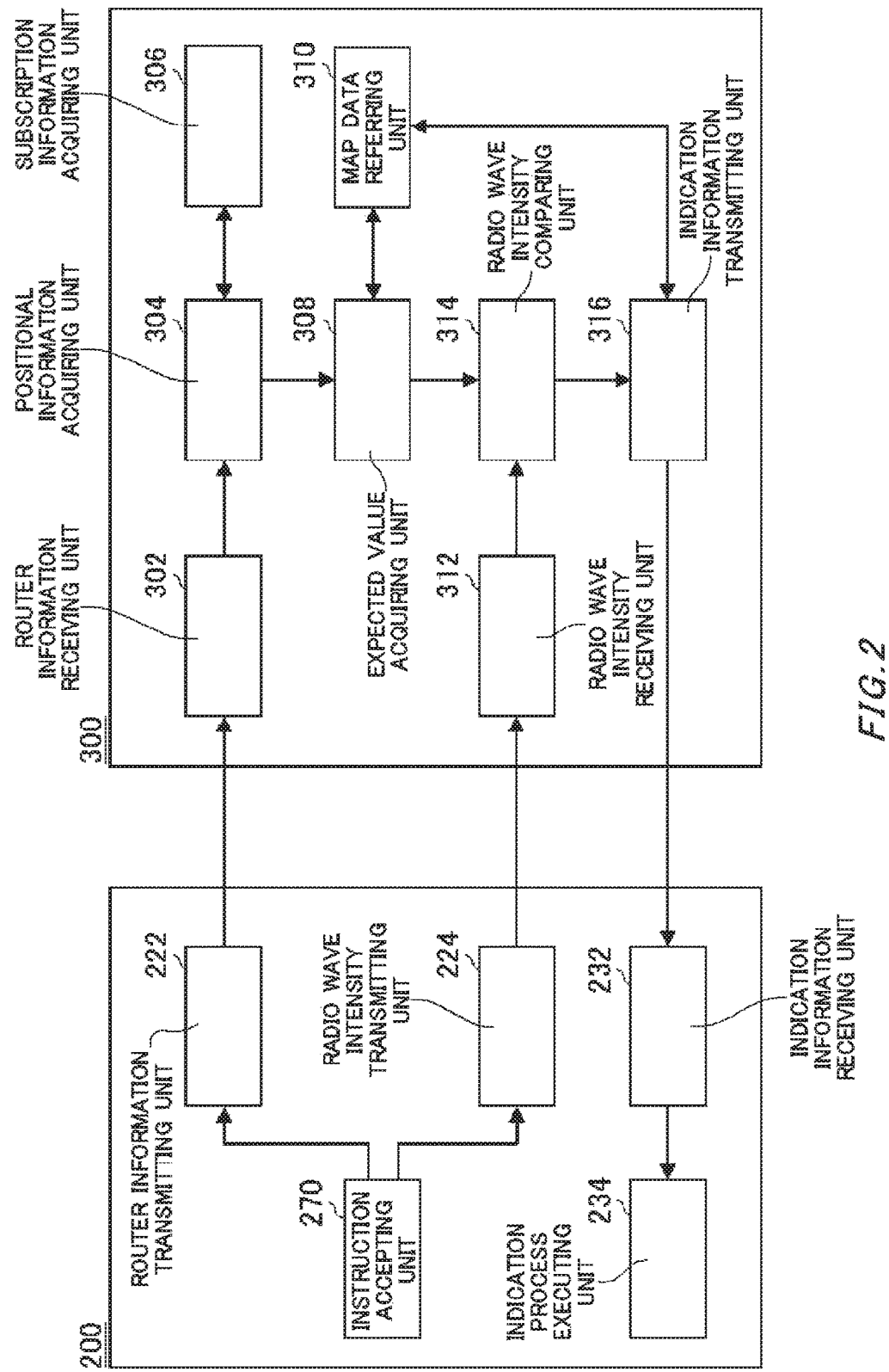
FIG. 2 schematically shows one example of the functional configuration of a wireless router and an expected value managing apparatus.

FIG. 2 schematically shows one example of the functional configuration of the wireless router 200 and the expected value managing apparatus 300. The wireless router 200 comprises a router information transmitting unit 222, a radio wave intensity transmitting unit 224, an indication information receiving unit 232, an indication process executing unit 234 and an instruction accepting unit 270. The expected value managing apparatus 300 comprises a router information receiving unit 302, a positional information acquiring unit 304, a subscription information acquiring unit 306, an expected value acquiring unit 308, a map data referring unit 310, a radio wave intensity receiving unit 312, a radio wave intensity comparing unit 314 and an indication information transmitting unit 316. Note that the wireless router 200 and the expected value managing apparatus 300 are not necessarily required to comprise all the units.

The router information transmitting unit 222 transmits router information about the wireless router 200 to the expected value managing apparatus 300. The router information may include router identification information about the wireless router 200. Also, the router information may include GPS data of the wireless router 200. Also, the router information may include base station identification information identifying the wireless base station 20 with which the wireless router 200 is in communication.

The radio wave intensity transmitting unit 224 transmits incoming radio wave intensity of the wireless router 200 to the expected value managing apparatus 300. The radio wave intensity transmitting unit 224 may measure incoming radio wave intensity in accordance with the first wireless communication system to transmit the measured incoming radio wave intensity. The radio wave intensity transmitting unit 224 measures, for example, as the incoming radio wave intensity, RSRP (Reference Signal Received Power) of radio waves received from the wireless base stations 20.

The router information receiving unit 302 receives router information transmitted by the router information transmitting unit 222. The positional information acquiring unit 304 acquires positional information indicating a position of the wireless router 200. When GPS data of the wireless router 200 is included in router information, the positional information acquiring unit 304 may acquire the GPS data as positional information about the wireless router 200.

Also, the positional information acquiring unit 304 may acquire positional information about the wireless router 200 by using router identification information included in router information. For example, the positional information acquiring unit 304 transmits the router identification information to the subscription information acquiring unit 306. The subscription information acquiring unit 306 receives, from the subscription information managing apparatus 30, subscription information corresponding to the router identification information. Then, the positional information acquiring unit 304 acquires, as positional information about the wireless router 200, an address included in the subscription information acquired by the subscription information acquiring unit 306.

The positional information acquiring unit 304 may acquire positional information about the wireless router 200 based on the subscription information acquired by the subscription information acquiring unit 306 and the base station identification information included in router information. For example, when an address included in subscription information is within a wireless coverage area covered by the wireless base station 20 identified by base station identification information, the positional information acquiring unit 304 acquires the address as positional information about the wireless router 200. Also, when an address included in subscription information is not within a wireless coverage area covered by the wireless base station 20 identified by base station identification information, the positional information acquiring unit 304 does not handle the address as positional information about the wireless router 200, but acquires, as positional information, the wireless coverage area covered by the wireless base station 20.

The expected value acquiring unit 308 acquires an expected value of incoming radio wave intensity at a position indicated by the positional information acquired by the positional information acquiring unit 304. The expected value acquiring unit 308 for example transmits, to the map data referring unit 310, positional information acquired by the positional information acquiring unit 304. Then, the expected value acquiring unit 308 receives, from the map data referring unit 310, an expected value of incoming radio wave intensity that the map data referring unit 310 has acquired by referring to map data in which expected values of incoming radio wave intensity at respective ones among a plurality of points on a map are associated with the plurality of points, the expected value corresponding to a position indicated by the positional information.

The radio wave intensity receiving unit 312 receives the incoming radio wave intensity transmitted by the radio wave intensity transmitting unit 224. The radio wave intensity comparing unit 314 compares the expected value acquired by the expected value acquiring unit 308 with incoming radio wave intensity received by the radio wave intensity receiving unit 312.

The indication information transmitting unit 316 transmits, to the wireless router 200, indication information based on a result of comparison by the radio wave intensity comparing unit 314. The indication information transmitting unit 316 transmits, to the wireless router 200, indication information indicating the difference between incoming radio wave intensity and an expected value, for example. The indication information transmitting unit 316 may transmit indication information to the communication terminal 400 pre-registered in the wireless router 200.

The indication information transmitting unit 316 may transmit, to the wireless router 200, indication information including arrangement-related information related to arrangement of the wireless router 200 generated based on map data referred to by the map data referring unit 310.

For example, the indication information transmitting unit 316 acquires an expected value of a point around a position indicated by positional information about the wireless router 200, the expected value being acquired from map data in which expected values of incoming radio wave intensity at respective ones among a plurality of points on a map are associated with the plurality of points. Then, the indication information transmitting unit 316 transmits, to the wireless router 200, indication information including arrangement-related information recommending arranging the wireless router 200 to face the direction, from a position indicated by positional information about the wireless router 200, towards a point where the expected value is higher.

For example, when, among a plurality of points around a position indicated by positional information about the wireless router 200, an expected value of a point on the east side of the position indicated by the positional information about the wireless router 200 is higher than those in other directions, indication information including arrangement-related information recommending moving the wireless router 200 toward the east side is transmitted to the wireless router 200. Thereby, the subscriber 50 or the like can be allowed to know a direction that is likely to improve incoming radio wave intensity of the wireless router 200.

The indication information receiving unit 232 receives indication information transmitted by the indication information transmitting unit 316. The indication process executing unit 234 executes an indication process based on indication information received by the indication information receiving unit 232.

The instruction accepting unit 270 may accept an instruction to receive indication information. When the instruction accepting unit 270 has accepted an instruction to receive indication information, it may cause the router information transmitting unit 222 to transmit router information, and cause the radio wave intensity transmitting unit 224 to transmit radio wave intensity. Thereby, it can receive indication information from the expected value managing apparatus 300.

Figure 3:
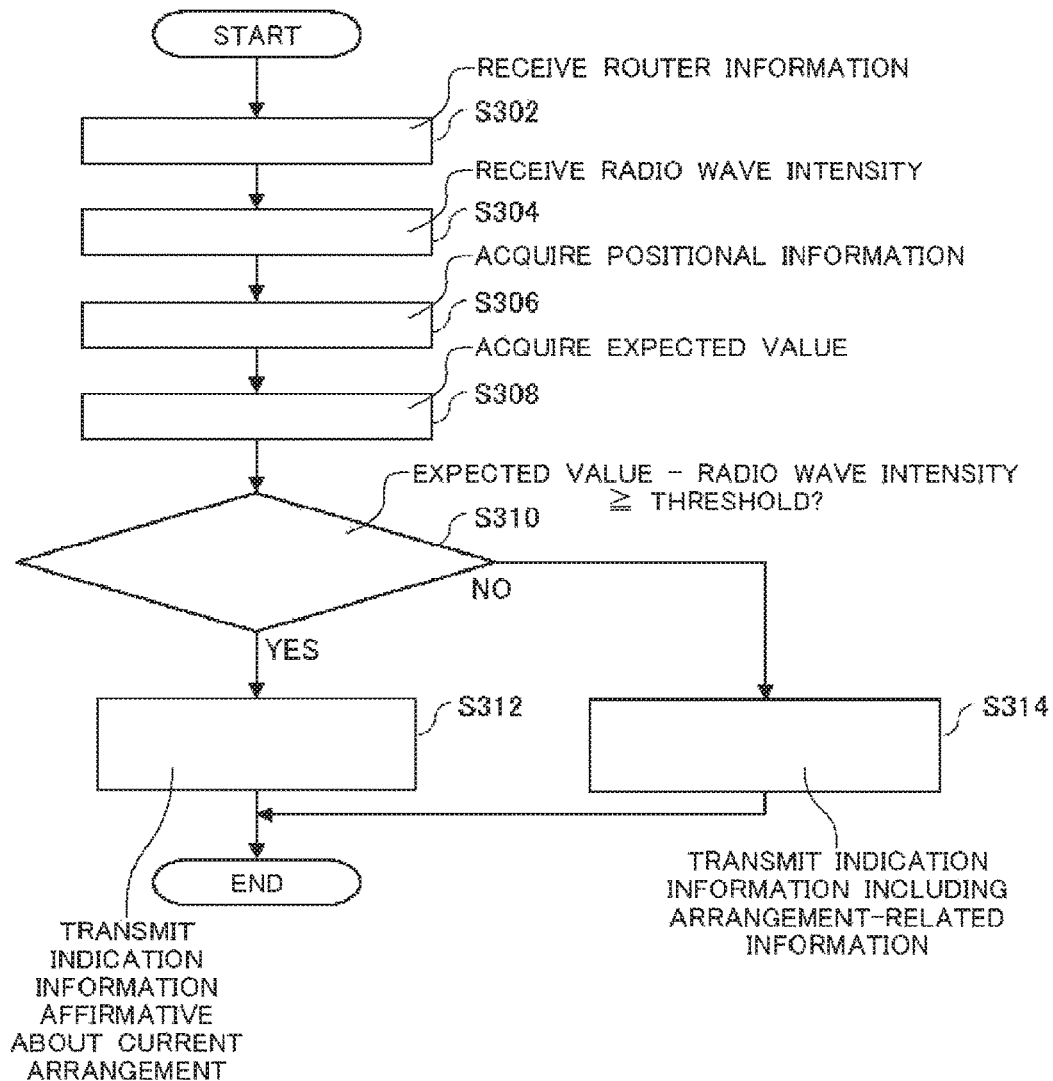
FIG. 3 schematically shows one example of the flow of processes performed by the expected value managing apparatus.

FIG. 3 schematically shows one example of the flow of processes performed by the expected value managing apparatus 300. Here, the flow of processes that starts from a state where data transmission from the wireless router 200 is awaited and ends when indication information is transmitted to the wireless router 200 is schematically explained. Each of the processes shown in FIG. 3 may be executed by a control unit provided to the expected value managing apparatus 300 as the subject.

At Step 302 ("steps" are abbreviated to "S" in some cases), the router information receiving unit 302 receives router information from the router information transmitting unit 222. At S304, the radio wave intensity receiving unit 312 receives, from the radio wave intensity transmitting unit 224, incoming radio wave intensity of the wireless router 200.

At S306, the positional information acquiring unit 304 acquires positional information about the wireless router 200. At S308, the expected value acquiring unit 308 acquires an expected value of incoming radio wave intensity at a position indicated by the positional information acquired at S306.

At S310, the radio wave intensity comparing unit 314 determines whether or not the difference between the expected value acquired at S308 and the incoming radio wave intensity received at S304 is equal to or larger than a predetermined threshold. When it is determined at S310 that the difference is equal to or larger than the threshold, the flow proceeds to S312. At S312, the indication information transmitting unit 316 transmits, to the wireless router 200, indication information that is affirmative about the current arrangement of the wireless router 200.

When it is not determined at S310 that the difference is equal to or larger than the threshold, the flow proceeds to S314. At 314, the indication information transmitting unit 316 transmits, to the wireless router 200, indication information including arrangement-related information that is generated based on map data referred to by the map data referring unit 310 and is related to arrangement of the wireless router 200.

Figure 4:
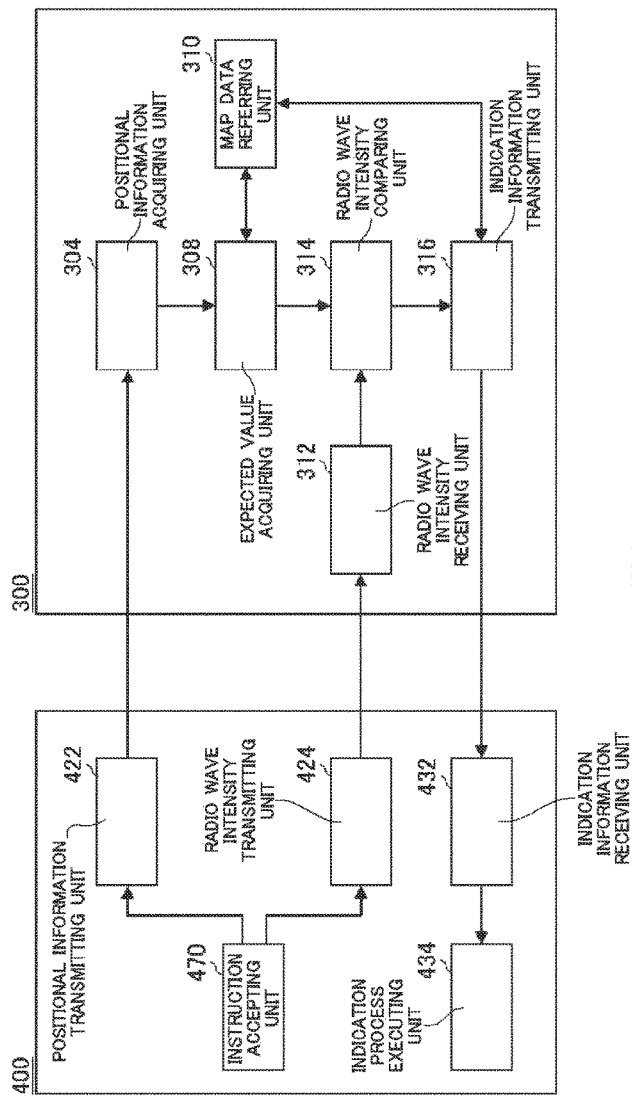
FIG. 4 schematically shows one example of the functional configuration of a communication terminal and the expected value managing apparatus.

FIG. 4 schematically shows one example of the functional configuration of the communication terminal 400 and the expected value managing apparatus 300. The communication terminal 400 comprises a positional information transmitting unit 422, a radio wave intensity transmitting unit 424, an indication information receiving unit 432, an indication process executing unit 434 and an instruction accepting unit 470. The expected value managing apparatus 300 comprises the positional information acquiring unit 304, the expected value acquiring unit 308, the map data referring unit 310, the radio wave intensity receiving unit 312, the radio wave intensity comparing unit 314 and the indication information transmitting unit 316. Explanation about the expected value managing apparatus 300 mainly focuses on differences from the one shown in FIG. 2.

The positional information transmitting unit 422 transmits positional information about the communication terminal 400 to the expected value managing apparatus 300. The communication terminal 400 may have a GPS function, and may transmit GPS data as positional information.

The radio wave intensity transmitting unit 424 transmits incoming radio wave intensity of the communication terminal 400 to the expected value managing apparatus 300. The radio wave intensity transmitting unit 424 may measure incoming radio wave intensity in accordance with the first wireless communication system to transmit the measured incoming radio wave intensity. The radio wave intensity transmitting unit 424 measures, for example, as the incoming radio wave intensity, RSRP (Reference Signal Received Power) of radio waves received from the wireless base stations 20.

The positional information acquiring unit 304 receives positional information transmitted by the positional information transmitting unit 422. The expected value acquiring unit 308 acquires an expected value of the incoming radio wave intensity at a position indicated by the positional information acquired by the positional information acquiring unit 304.

The radio wave intensity receiving unit 312 receives the incoming radio wave intensity transmitted by the radio wave intensity transmitting unit 424. The radio wave intensity comparing unit 314 compares the expected value acquired by the expected value acquiring unit 308 with the incoming radio wave intensity received by the radio wave intensity receiving unit 312. The indication information transmitting unit 316 transmits, to the communication terminal 400, indication information based on a result of comparison by the radio wave intensity comparing unit 314.

The indication information receiving unit 432 receives indication information transmitted by the indication information transmitting unit 316. The indication process executing unit 434 executes an indication process according to the indication information received by the indication information receiving unit 432.

The instruction accepting unit 470 may accept an instruction to receive indication information. When the instruction accepting unit 470 has accepted an instruction to receive indication information, it may cause the positional information transmitting unit 422 to transmit positional information, and may cause the radio wave intensity transmitting unit 424 to transmit radio wave intensity. Thereby, it can receive indication information from the expected value managing apparatus 300.

As described above, with the radio wave intensity transmitting unit 424 measuring incoming radio wave intensity in accordance with the first wireless communication system which is also employed by the radio wave intensity transmitting unit 224 provided to the wireless router 200, and transmitting the measured incoming radio wave intensity to the expected value managing apparatus 300, the incoming radio wave status of the wireless router 200 can be checked by using the communication terminal 400 instead of the wireless router 200. For example, while carrying the communication terminal 400, the subscriber 50 can check the incoming radio wave intensity and expected values of a plurality of points in a house to seek a position that achieves incoming radio wave intensity which is closest to the expected value and arrange the wireless router 200 at the specified position. Because the communication terminal 400 is easier to carry than the wireless router 200 is, a burden on the subscriber 50 to seek an optimum location to arrange the wireless router 200 can be mitigated.

Figure 5:
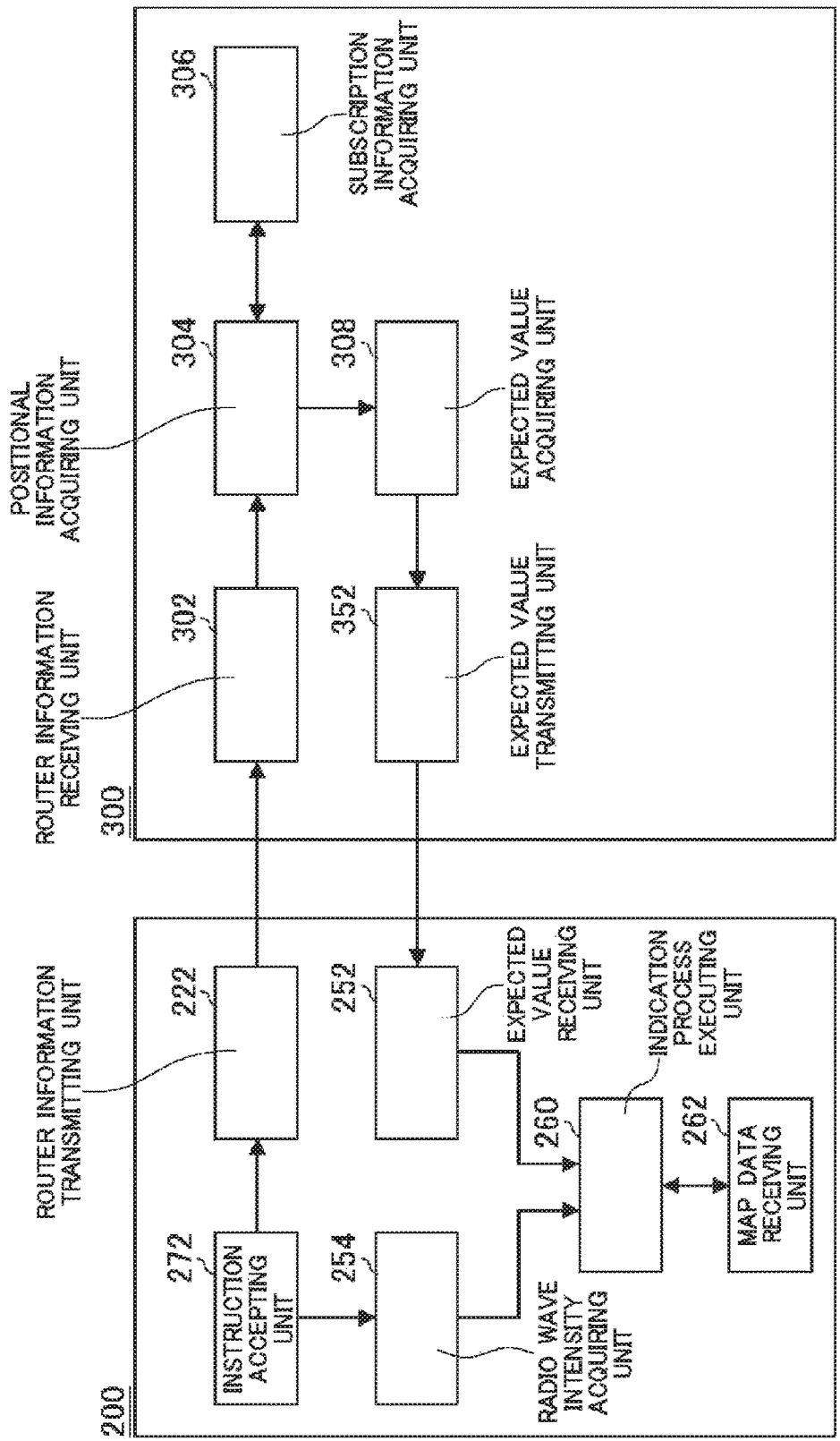
FIG. 5 schematically shows another one example of the functional configuration of the wireless router and the expected value managing apparatus.

FIG. 5 schematically shows another one example of the functional configuration of the wireless router 200 and the expected value managing apparatus 300. The wireless router 200 comprises the router information transmitting unit 222, an expected value receiving unit 252, a radio wave intensity acquiring unit 254, an indication process executing unit 260, a map data receiving unit 262 and an instruction accepting unit 272. Note that the wireless router 200 is not necessarily required to comprise all the units. The expected value managing apparatus 300 comprises the router information receiving unit 302, the positional information acquiring unit 304, the subscription information acquiring unit 306, the expected value acquiring unit 308 and an expected value transmitting unit 352. Here, explanation about the wireless router 200 and the expected value managing apparatus 300 mainly focuses on differences from the ones shown in FIG. 2.

The expected value transmitting unit 352 transmits an expected value acquired by the expected value acquiring unit 308 to the wireless router 200. The expected value receiving unit 252 receives the expected value transmitted by the expected value transmitting unit 352.

The radio wave intensity acquiring unit 254 acquires the incoming radio wave intensity of the wireless router 200. The radio wave intensity acquiring unit 254 may measure the incoming radio wave intensity in accordance with the first wireless communication system. The radio wave intensity acquiring unit 254 measures, for example, as the incoming radio wave intensity, RSRP (Reference Signal Received Power) of radio waves received from the wireless base stations 20.

The indication process executing unit 260 executes an indication process based on the incoming radio wave intensity acquired by the radio wave intensity acquiring unit 254 and the expected value received by the expected value receiving unit 252. The indication process executing unit 260 for example indicates the incoming radio wave intensity and the expected value. Also, the indication process executing unit 260 for example indicates the difference between the incoming radio wave intensity and the expected value.

The map data receiving unit 262 receives map data. The map data receiving unit 262 for example receives map data in which expected values of incoming radio wave intensity at respective ones among a plurality of points on a map are associated with the plurality of points.

When the incoming radio wave intensity acquired by the radio wave intensity acquiring unit 254 is lower than the expected value received by the expected value receiving unit 252, the indication process executing unit 260 may execute an indication process of indicating arrangement-related information that is generated based on the map data received by the map data receiving unit 262 and is related to arrangement of the wireless router 200.

The instruction accepting unit 272 may accept an instruction to execute an indication process. When the instruction accepting unit 272 has accepted an instruction to execute an indication process, it may cause the router information transmitting unit 222 to transmit router information, and cause the radio wave intensity acquiring unit 254 to acquire radio wave intensity.

Figure 6:
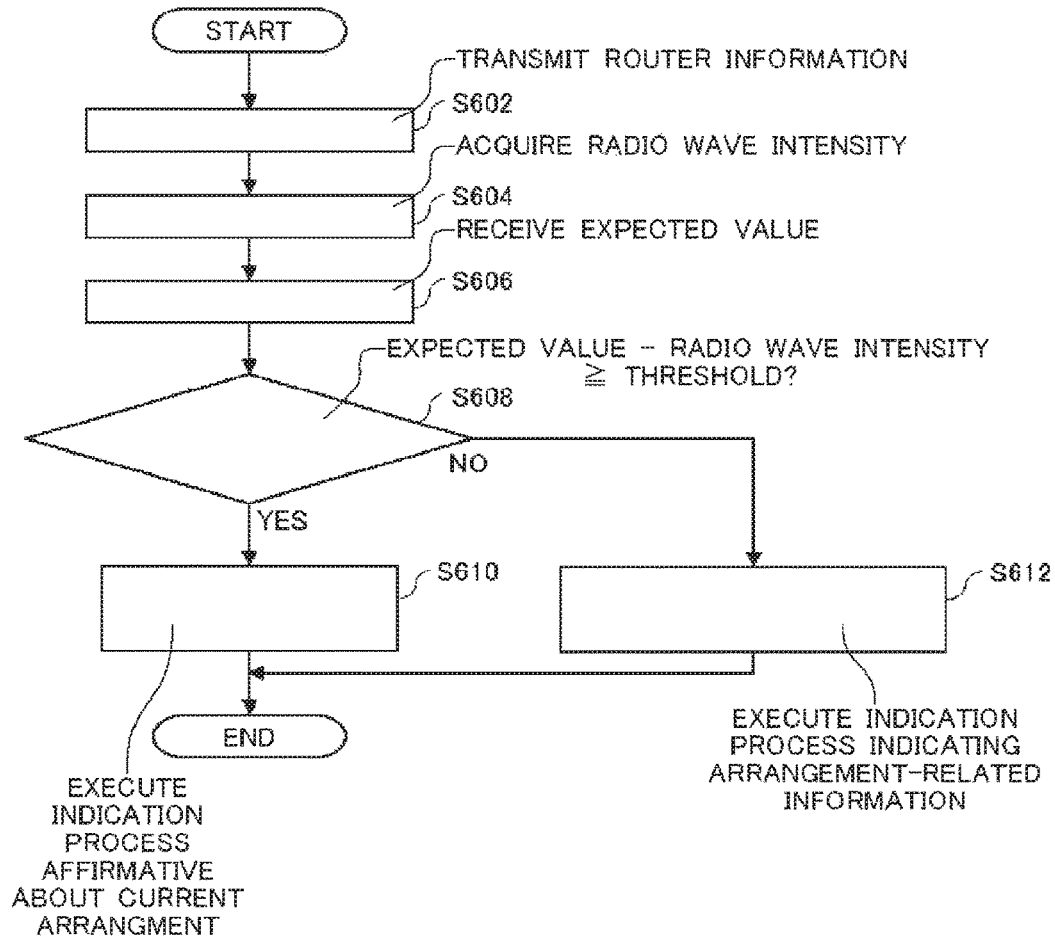
FIG. 6 schematically shows one example of the flow of processes performed by the wireless router.

FIG. 6 schematically shows one example of the flow of processes performed by the wireless router 200. Here, the flow of processes that starts when the instruction accepting unit 272 has accepted an instruction to execute an indication process and ends when it executes the indication process is schematically explained. Each of the processes shown in FIG. 6 may be executed by a control unit provided to the wireless router 200 as the subject.

At S602, the router information transmitting unit 222 transmits router information to the expected value managing apparatus 300. At S604, the radio wave intensity acquiring unit 254 acquires incoming radio wave intensity. At S606, the expected value receiving unit 252 receives an expected value from the expected value managing apparatus 300.

At S608, the indication process executing unit 260 determines whether or not the difference between the expected value acquired at S606 and the incoming radio wave intensity received at S604 is equal to or larger than a predetermined threshold. When it is determined at S608 that the difference is equal to or larger than the threshold, the flow proceeds to S610. At S610, the indication process executing unit 260 executes an indication process that is affirmative about current arrangement of the wireless router 200.

When it is not determined at S608 that the difference is equal to or larger than the threshold, the flow proceeds to S612. At S612, the indication process executing unit 260 executes an indication process of indicating arrangement-related information that is generated based on map data received by the map data receiving unit 262 and is related to arrangement of the wireless router 200.

Figure 7:
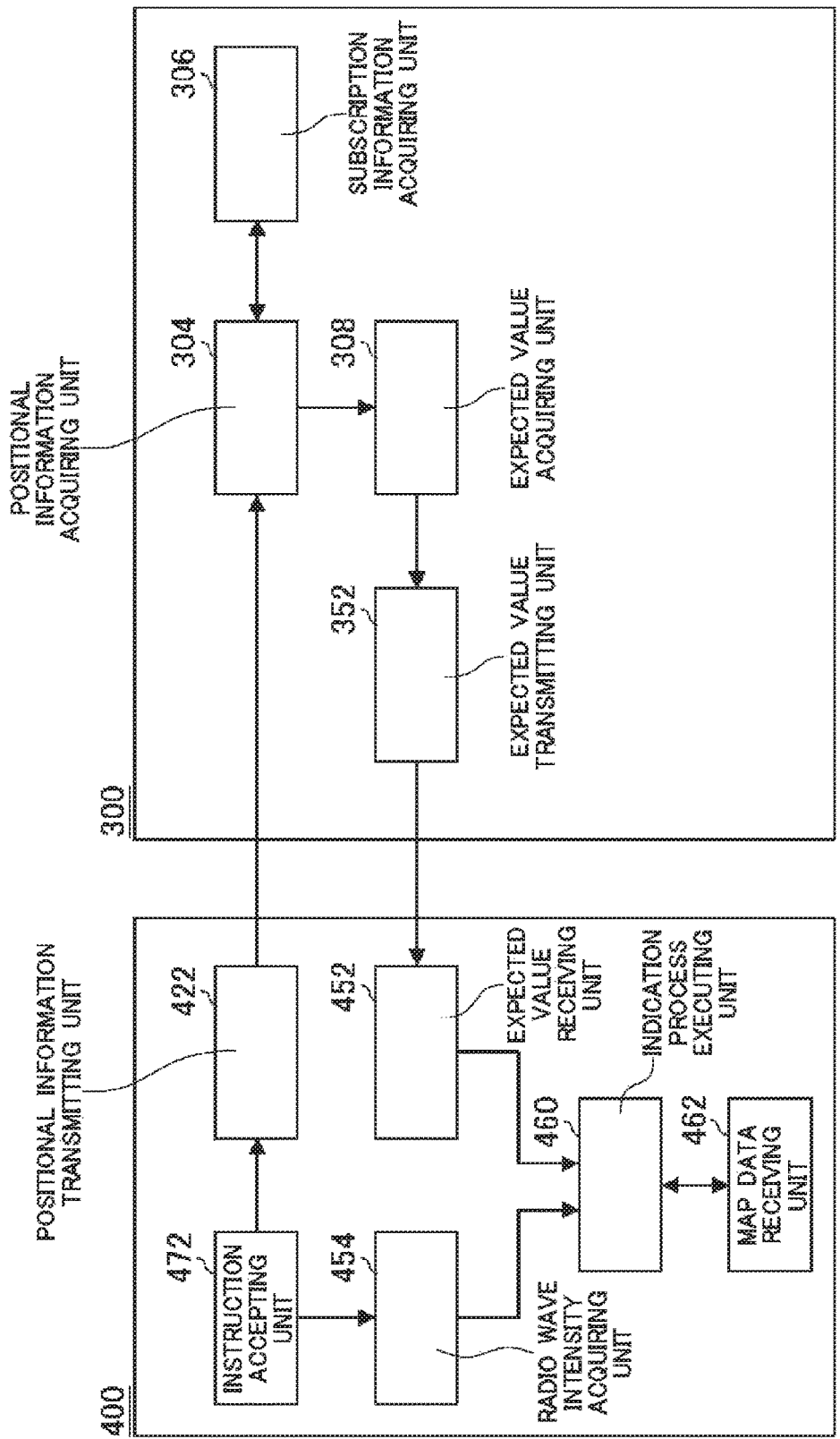
FIG. 7 schematically shows another one example of the functional configuration of the communication terminal and the expected value managing apparatus.

FIG. 7 schematically shows another one example of the functional configuration of the communication terminal 400 and the expected value managing apparatus 300. The communication terminal 400 comprises the positional information transmitting unit 422, an expected value receiving unit 452, a radio wave intensity acquiring unit 454, an indication process executing unit 460, a map data receiving unit 462 and an instruction accepting unit 472. The expected value managing apparatus 300 comprises the positional information acquiring unit 304, the subscription information acquiring unit 306, the expected value acquiring unit 308 and the expected value transmitting unit 352. Explanation about the expected value managing apparatus 300 mainly focuses on differences from the one shown in FIG. 5.

The positional information transmitting unit 422 transmits positional information about the communication terminal 400 to the communication terminal 400. The communication terminal 400 may have a GPS function, and may transmit GPS data as positional information.

The expected value transmitting unit 352 transmits, to the communication terminal 400, an expected value acquired by the expected value acquiring unit 308. The expected value receiving unit 452 receives the expected value transmitted by the expected value transmitting unit 352.

The radio wave intensity acquiring unit 454 acquires the incoming radio wave intensity of the communication terminal 400. The radio wave intensity acquiring unit 454 may measure the incoming radio wave intensity in accordance with the first wireless communication system. The radio wave intensity acquiring unit 454 measures, for example, RSRP (Reference Signal Received Power) of radio waves received from the wireless base stations 20.

The indication process executing unit 460 executes an indication process based on the incoming radio wave intensity acquired by the radio wave intensity acquiring unit 454 and the expected value received by the expected value receiving unit 452. The indication process executing unit 460 for example indicates the incoming radio wave intensity and the expected value. Also, the indication process executing unit 460 for example indicates the difference between the incoming radio wave intensity and the expected value.

The map data receiving unit 462 receives map data. The map data receiving unit 462 for example receives map data in which expected values of incoming radio wave intensity at respective ones among a plurality of points on a map are associated with the plurality of points.

When the incoming radio wave intensity acquired by the radio wave intensity acquiring unit 454 is lower than the expected value received by the expected value receiving unit 452, the indication process executing unit 460 may execute an indication process of indicating arrangement-related information that is generated based on the map data received by the map data receiving unit 462 and is related to arrangement of the communication terminal 400.

The instruction accepting unit 472 may accept an instruction to execute an indication process. When the instruction accepting unit 472 has accepted an instruction to execute an indication process, it may cause the positional information transmitting unit 422 to transmit positional information, and cause the radio wave intensity acquiring unit 454 to acquire radio wave intensity.

Figure 8:
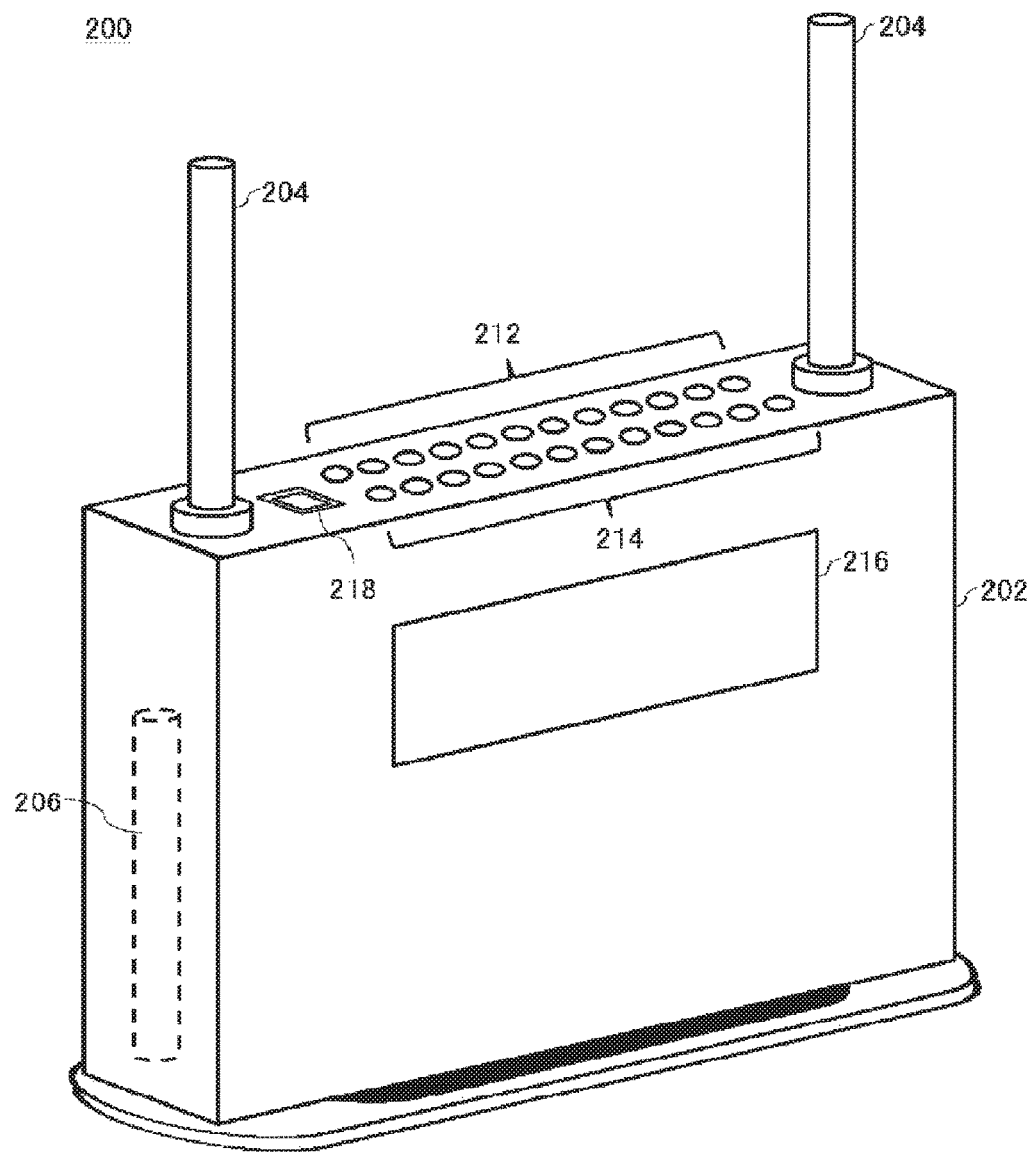
FIG. 8 schematically shows one example of the external appearance of the wireless router.

FIG. 8 schematically shows one example of the external appearance of the wireless router 200. The wireless router 200 comprises a housing 202, an antenna 204, an antenna 206, a plurality of incoming radio wave intensity light emitting units 212, a plurality of expected value light emitting units 214, a display 216 and a radio wave button 218.

The antenna 204 is an antenna corresponding to the first wireless communication system. The antenna 206 is an antenna corresponding to the second wireless communication system. The plurality of incoming radio wave intensity light emitting units 212 and the plurality of expected value light emitting units 214 are LEDs for example.

Respective ones among the plurality of incoming radio wave intensity light emitting units 212 correspond to respective ones among a plurality of incoming radio wave intensity levels in the first wireless communication system. The plurality of incoming radio wave intensity light emitting units 212 may be arranged in the order of corresponding incoming radio wave intensity levels.

The indication process executing unit 234 and the indication process executing unit 260 may indicate incoming radio wave intensity of the wireless router 200 by causing, among the plurality of incoming radio wave intensity light emitting units 212, an incoming radio wave intensity light emitting unit 212 corresponding to the incoming radio wave intensity of the wireless router 200, and all the incoming radio wave intensity light emitting units 212 corresponding to the incoming radio wave intensity lower than the above-mentioned incoming radio wave intensity to emit light. Also, the indication process executing unit 234 and the indication process executing unit 260 may indicate the incoming radio wave intensity of the wireless router 200 by causing, among the plurality of incoming radio wave intensity light emitting units 212, only an incoming radio wave intensity light emitting unit 212 corresponding to the incoming radio wave intensity of the wireless router 200 to emit light.

Respective ones among the plurality of expected value light emitting units 214 correspond to respective ones among a plurality of expected values of incoming radio wave intensity in the first wireless communication system. The plurality of expected value light emitting units 214 may be arranged in the order of corresponding expected values.

The indication process executing unit 234 and the indication process executing unit 260 may indicate an expected value of incoming radio wave intensity at the position of the wireless router 200 by causing, among the plurality of expected value light emitting units 214, an expected value light emitting unit 214 corresponding to the expected value of the incoming radio wave intensity, and all the expected value light emitting units 214 corresponding to expected values lower than the above-mentioned expected value to emit light. Also, the indication process executing unit 234 and the indication process executing unit 260 may indicate an expected value of incoming radio wave intensity at the position of the wireless router 200 by causing, among the plurality of expected value light emitting units 214, only an expected value light emitting unit 214 corresponding to the expected value of the incoming radio wave intensity to emit light.

The plurality of the incoming radio wave intensity light emitting units 212 and the plurality of expected value light emitting units 214 may be arranged in parallel. An incoming radio wave intensity light emitting units 212 and an expected value light emitting unit 214 that are adjacent to each other may correspond to the same incoming radio wave intensity level. Thereby, incoming radio wave intensity and an expected value can be readily compared against each other.

Note that although the case where the wireless router 200 comprises the plurality of incoming radio wave intensity light emitting units 212 and the plurality of expected value light emitting units 214 has been explained as an example here, this is not the only case. The wireless router 200 may comprise a plurality of light-emitting units arrayed in one row. The plurality of light-emitting units arrayed in one row may correspond to respective ones among a plurality of incoming radio wave intensity levels, and may be arrayed in the order of corresponding incoming radio wave intensity levels. The indication process executing unit 234 and the indication process executing unit 260 may use the plurality of light-emitting units arrayed in one row to indicate incoming radio wave intensity and an expected value in a switching manner.

For example, when the wireless router 200 is set to an incoming radio wave intensity indication mode, the indication process executing unit 234 and the indication process executing unit 260 indicate incoming radio wave intensity by causing the plurality of light-emitting units arrayed in one row to emit light. Also, when the wireless router 200 is set to an expected value indication mode, the indication process executing unit 234 and the indication process executing unit 260 may indicate an expected value by causing the plurality of light-emitting units arrayed in one row to emit light.

Also, the indication process executing unit 234 and the indication process executing unit 260 may indicate an expected value by causing, among the plurality of light-emitting units arrayed in one row, only a light-emitting unit corresponding to the expected value to emit light continuously, and indicate incoming radio wave intensity by causing, among the plurality of light-emitting units, a light-emitting unit corresponding to the incoming radio wave intensity and all the light-emitting units corresponding to incoming radio wave intensity lower than the above-mentioned incoming radio wave intensity to emit light. Thereby, indication in which an indicator expressed by the plurality of light-emitting units expands towards or contracts from the light-emitting unit corresponding to the expected value can be realized. Note that different colors may be used as the luminescent color for indicating an expected value and the luminescent color for indicating incoming radio wave intensity.

Also, the indication process executing unit 234 and the indication process executing unit 260 may change the incoming radio wave intensity levels allocated to respective ones among the plurality of light-emitting units depending on expected values. For example, when the expected value is −80 dBm, incoming radio wave intensity levels may be allocated to the plurality of light-emitting units every −5 dBm (−80 dBm is the highest value), and when the expected value is −90 dBm, incoming radio wave intensity levels may be allocated to the plurality of light-emitting units every −5 dBm (−90 dBm is the highest value). Thereby, the current incoming radio wave level relative to the highest incoming radio wave intensity level that can be expected at the position of the wireless router 200 can be readily known.

The display 216 displays various types of data. The indication process executing unit 234 and the indication process executing unit 260 may indicate incoming radio wave intensity by causing the display 216 to display the incoming radio wave intensity. The indication process executing unit 234 and the indication process executing unit 260 may cause the display 216 to display incoming radio wave intensity by using figures such as indicators, numerical values or the like.

Also, the indication process executing unit 234 and the indication process executing unit 260 may indicate an expected value by causing the display 216 to display the expected value. The indication process executing unit 234 and the indication process executing unit 260 may cause the display 216 to display an expected value by using figures such as indicators, numerical values or the like.

Also, the indication process executing unit 234 and the indication process executing unit 260 may indicate the difference between an expected value and incoming radio wave intensity by causing the display 216 to display the difference between the expected value and the incoming radio wave intensity. The indication process executing unit 234 and the indication process executing unit 260 may cause the display 216 to display a text indicating the difference between an expected value and incoming radio wave intensity.

For example, the indication process executing unit 234 and the indication process executing unit 260 causes the display 216 to display contents that are affirmative about current arrangement when the difference between an expected value and incoming radio wave intensity is smaller than a predetermined threshold. Contents that are affirmative about current arrangement are for example contents that indicate that incoming radio wave intensity that is comparable to an expected value has been achieved at the current arrangement location.

Also, for example, the indication process executing unit 234 and the indication process executing unit 260 may cause the display 216 to display contents recommending moving the wireless router 200 when the difference between an expected value and incoming radio wave intensity is larger than a predetermined threshold. The indication process executing unit 234 and the indication process executing unit 260 for example causes the display 216 to display contents recommending arranging the wireless router 200 near a window.

Also, the indication process executing unit 234 and the indication process executing unit 260 may indicate arrangement-related information by causing the display 216 to display the arrangement-related information. The indication process executing unit 234 and the indication process executing unit 260 may cause the display 216 to display contents recommending moving the wireless router 200 to face the direction, from a position indicated by positional information about the wireless router 200, towards a point where the expected value is higher.

The indication process executing unit 234 and the indication process executing unit 260 may cause the display 216 to display contents indicating the direction, from a position indicated by positional information about the wireless router 200, towards the wireless base station 20 with which the wireless router 200 is in communication. For example, the indication process executing unit 234 and the indication process executing unit 260 may cause the display 216 to display information indicating that there is the wireless base station 20 with which the wireless router 200 is in communication in the southeast when the direction, from a position indicated by positional information about the wireless router 200, towards the wireless base station 20 is the southeast. Thereby, the subscriber 50 or the like can know a situation where the wireless router 200 can be brought close to the wireless base stations 20 by moving the wireless router 200 in the southeastern direction.

The radio wave button 218 may be a button to accept an instruction to execute an indication process. The instruction accepting unit 270 may accept an instruction to the radio wave button 218. The instruction accepting unit 270 may cause the router information transmitting unit 222 to transmit router information and cause the radio wave intensity transmitting unit 224 to transmit incoming radio wave intensity upon detecting the radio wave button 218 being pressed. Also, the instruction accepting unit 272 may cause the router information transmitting unit 222 to transmit router information and cause the radio wave intensity acquiring unit 254 to acquire incoming radio wave intensity upon detecting the radio wave button 218 being pressed.

When pressing of the radio wave button 218 has been detected, the instruction accepting unit 270 may cause the router information transmitting unit 222 to transmit router information and cause the radio wave intensity transmitting unit 224 to transmit incoming radio wave intensity continuously for a predetermined length of time. When pressing of the radio wave button 218 has been detected, the instruction accepting unit 272 may cause the router information transmitting unit 222 to transmit router information and cause the radio wave intensity acquiring unit 254 to acquire incoming radio wave intensity continuously for a predetermined length of time.

Thereby, for example, after pressing the radio wave button 218, the subscriber 50 can continuously check a result of comparison between changing expected values and incoming radio wave intensity by moving the wireless router 200. Note that the instruction accepting unit 270 and the instruction accepting unit 272 may cause also the router information transmitting unit 222 to transmit router information continuously for a predetermined length of time.

The radio wave button 218 may be a toggle button. The instruction accepting unit 270 may cause the router information transmitting unit 222 to transmit router information and cause the radio wave intensity transmitting unit 224 to transmit incoming radio wave intensity continuously for a predetermined length of time when having detected pressing of an operation button, and may cause the radio wave intensity transmitting unit 224 to stop transmission of the radio wave intensity when having detected pressing of the operation button again. Also, the instruction accepting unit 272 may cause the router information transmitting unit 222 to transmit router information and cause the radio wave intensity acquiring unit 254 to acquire incoming radio wave intensity continuously for a predetermined length of time when having detected pressing of an operation button, and may cause the radio wave intensity acquiring unit 254 to stop acquisition of the incoming radio wave intensity when having detected pressing of the operation button again.

Note that although the case where the radio wave button 218 comprises one button is has been explained as an example here, this is not the only case. The radio wave button 218 may comprise two buttons, one button for incoming radio wave intensity and the other button for an expected value.

Figure 9:
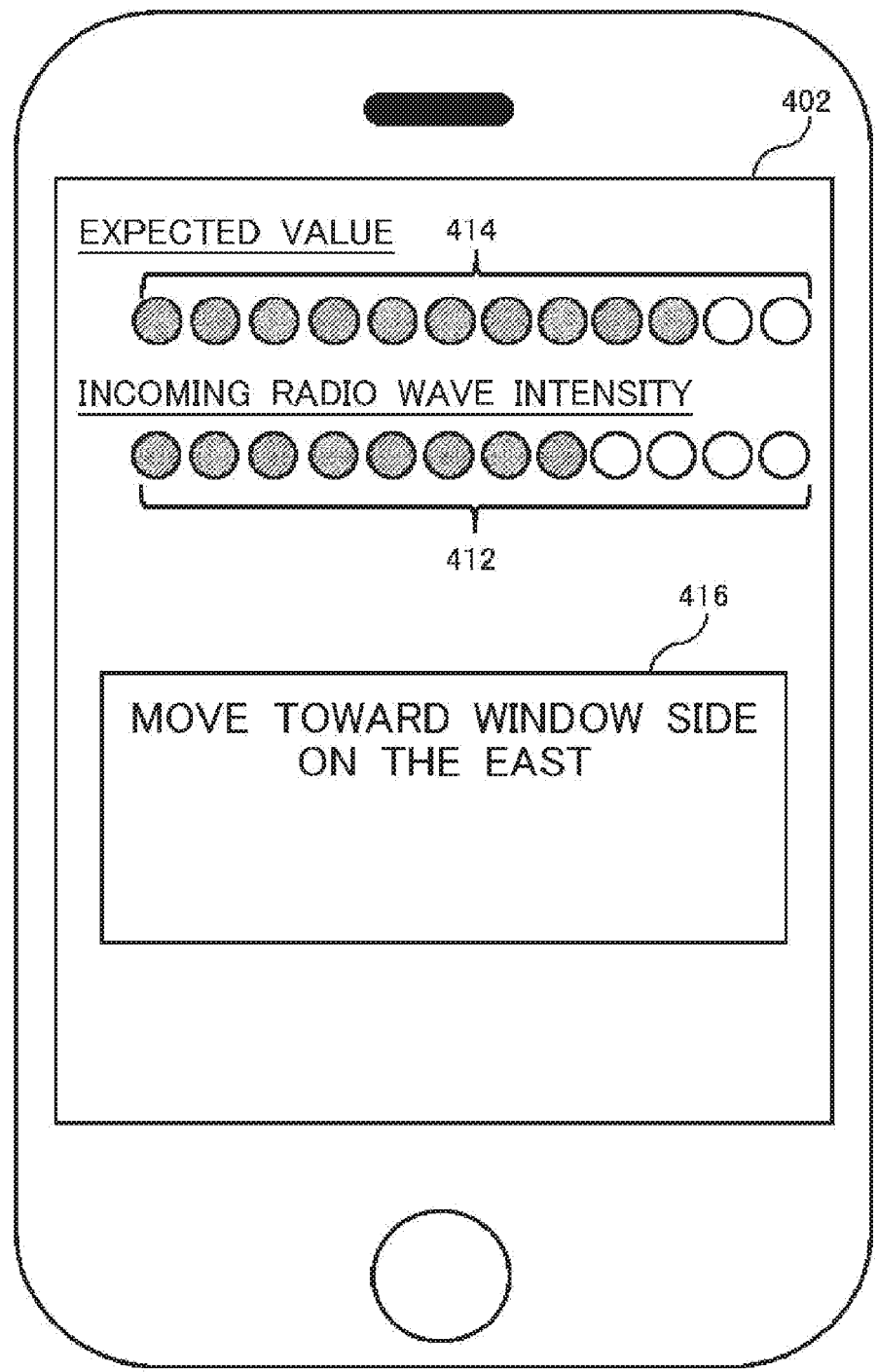
FIG. 9 schematically shows a display example of the communication terminal.

FIG. 9 schematically shows a display example of the communication terminal 400. The communication terminal 400 may indicate incoming radio wave intensity by causing a display 402 to display a plurality of incoming radio wave intensity indication objects 412. Also, the communication terminal 400 may indicate an expected value by causing the display 402 to a plurality of expected value indication objects 414.

Respective ones among the plurality of incoming radio wave intensity indication objects 412 correspond to respective ones among a plurality of incoming radio wave intensity levels in the first wireless communication system. The plurality of incoming radio wave intensity indication objects 412 may be arranged in the order of corresponding incoming radio wave intensity levels.

The indication process executing unit 234 and the indication process executing unit 260 may indicate the incoming radio wave intensity of the communication terminal 400 by displaying the plurality of incoming radio wave intensity indication objects 412 by discriminating between an incoming radio wave intensity indication object 412 corresponding to the incoming radio wave intensity of the communication terminal 400 and all the incoming radio wave intensity indication objects 412 corresponding to incoming radio wave intensity lower than the above-mentioned incoming radio wave intensity, and the other incoming radio wave intensity indication objects 412. Also, the indication process executing unit 234 and the indication process executing unit 260 may indicate the incoming radio wave intensity of the communication terminal 400 by displaying the plurality of incoming radio wave intensity indication objects 412 by discriminating only an incoming radio wave intensity indication object 412 corresponding to the incoming radio wave intensity of the communication terminal 400.

Respective ones among the plurality of expected value indication objects 414 correspond to respective ones among a plurality of expected values of the plurality of incoming radio wave intensity in the first wireless communication system. The plurality of expected value indication objects 414 may be arrayed in the order of corresponding expected values.

The indication process executing unit 234 and the indication process executing unit 260 may indicate an expected value of the incoming radio wave intensity the position of the communication terminal 400 by displaying the plurality of expected value indication objects 414 by discriminating between an expected value indication object 414 corresponding to the expected value and all the expected value indication objects 414 corresponding to expected values smaller than the above-mentioned expected value, and the other expected value indication objects 414. Also, the indication process executing unit 234 and the indication process executing unit 260 may indicate an expected value of the incoming radio wave intensity at the position of the communication terminal 400 by displaying the plurality of expected value indication objects 414 by discriminating only an expected value indication object 414 corresponding to the expected value. FIG. 9 illustrates the case where the level of the expected value is ten out of 12 levels, and the level of the incoming radio wave intensity is eight out of 12 levels.

The plurality of incoming radio wave intensity indication objects 412 and the plurality of expected value indication objects 414 may be arranged in parallel. An incoming radio wave intensity indication object 412 and an expected value indication object 414 that are adjacent to each other may correspond to the same incoming radio wave intensity level. Thereby, incoming radio wave intensity and an expected value can be readily compared against each other.

Note that although the case where the communication terminal 400 causes the display 402 to display the plurality of incoming radio wave intensity indication objects 412 and the plurality of expected value indication objects 414 has been explained as an example here, this is not the only case, and the display 402 may be caused to display a plurality of objects arrayed in one row. The plurality of objects arrayed in one row may correspond to respective ones among a plurality of incoming radio wave intensity levels, and may be arrayed in the order of corresponding incoming radio wave intensity levels. The indication process executing unit 234 and the indication process executing unit 260 may use the plurality of objects arrayed in one row to indicate incoming radio wave intensity and an expected value in a switching manner.

For example, when the communication terminal 400 is set to an incoming radio wave intensity indication mode, the indication process executing unit 234 and the indication process executing unit 260 indicate incoming radio wave intensity by causing, among the plurality of objects arrayed in one row, an object corresponding to the incoming radio wave intensity to be displayed discriminatively. Also, for example, when the communication terminal 400 is set to an expected value indication mode, the indication process executing unit 234 and the indication process executing unit 260 indicate an expected value by causing, among the plurality of objects arrayed in one row, an object corresponding to the expected value to be displayed discriminatively.

Also, the indication process executing unit 234 and the indication process executing unit 260 may indicate an expected value by causing, among the plurality of objects arrayed in one row, only an object corresponding to the expected value to be displayed continuously discriminatively, and indicate incoming radio wave intensity by causing, among the plurality of objects, an object corresponding to the incoming radio wave intensity and all the objects corresponding to incoming radio wave intensity lower than the above-mentioned incoming radio wave intensity to be displayed discriminatively. Thereby, indication in which an indicator expressed by the plurality of objects expands towards or contracts from an object corresponding to the expected value can be realized. Note that different colors may be used as the color of an object for indicating an expected value and the color of an object for indicating incoming radio wave intensity.

The data display column 416 displays various types of data. The data display column 416 may be able to display contents that are the same with contents the display 216 provided to the wireless router 200 is able to display. For example, the data display column 416 may display incoming radio wave intensity, may display an expected value, may display the difference between incoming radio wave intensity and an expected value, and may display arrangement-related information.

Although in the above-mentioned embodiment, the case where the expected value managing apparatus 300 transmits an expected value or indication information in response to a request from the wireless router 200 has been explained as an example, this is not the only case. The expected value managing apparatus 300 may actively transmit an expected value or indication information to the wireless router 200. For example, the expected value managing apparatus 300 monitors the incoming radio wave status of the wireless router 200 by referring to map data managed by a GIS. Then, for example, when the incoming radio wave status of the wireless router 200 changes due to addition, removal or the like of the wireless base stations 20, the expected value managing apparatus 300 actively transmits an expected value or indication information to the wireless router 200. Thereby, the subscriber 50 or the like can be allowed to know the situations where the incoming radio wave intensity of the wireless router 200 has changed or where an expected value has changed due to addition, removal or the like of the wireless base stations 20, when those situations have occurred. Note that the expected value managing apparatus 300 transmits, to the wireless router 200, for example: indication information indicating that incoming radio wave intensity has changed; indication information indicating that an expected value has changed; indication information indicating that the difference between incoming radio wave intensity and an expected value has changed; indication information indicating that a wireless base station 20 near the wireless router 200 has been removed; indication information indicating that a wireless base station 20 has been added near the wireless router 200; or the like.

Although in the above-mentioned embodiment, the wireless router 200 and the communication terminal 400 were explained as one examples of communication apparatuses, they are not the only examples. The communication apparatuses may be an electrical product comprising an antenna for the first wireless communication system, an antenna for the second wireless communication system and a display unit, and may for example be a television. Note that the communication apparatus may not comprise an antenna for the first wireless communication system, but may be connected with an antenna for the first wireless communication system via wireless communication. For example, the communication apparatus may comprise a Wi-Fi communication function for the 2.4 GHz band and a Wi-Fi communication function for the 5 GHz band, may be wirelessly connected with an antenna for the first wireless communication system via Wi-Fi communication of the 5 GHz band, and may communicate with the communication terminal 400 via Wi-Fi communication of the 2.4 GHz band.

In the explanation above, each unit of the wireless router 200 may be realized by hardware, or may be realized by software. Also, they may be realized by combinations of hardware and software. Also, execution of a program may cause a computer to function as the wireless router 200. The program may be installed, from a computer-readable medium or a storage connected to a network, in the computer that constitutes at least a part of the wireless router 200.

The programs that are installed in the computer and cause the computer to function as the wireless router 200 according to the present embodiment may operate on a CPU or the like to respectively cause the computer function as each unit of the wireless router 200. Information processing described in these programs is read in by the computer to function as a specific means realized by cooperation between software and hardware resources of the wireless router 200.

In the explanation above, each unit of the expected value managing apparatus 300 may be realized by hardware, or may be realized by software. Also, they may be realized by combinations of hardware and software. Also, execution of a program may cause a computer to function as the expected value managing apparatus 300. The program may be installed, from a computer-readable medium or a storage connected to a network, in the computer that constitutes at least a part of the expected value managing apparatus 300.

The programs that are installed in the computer and cause the computer to function as the expected value managing apparatus 300 according to the present embodiment may operate on a CPU or the like to respectively cause the computer function as each unit of the expected value managing apparatus 300. Information processing described in these programs is read in by the computer to function as a specific means realized by cooperation between software and hardware resources of the expected value managing apparatus 300.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: network
20: wireless base station
30: subscription information managing apparatus
50: subscriber
100: radio wave status indicating system
200: wireless router
202: housing
204: antenna
206: antenna
212: incoming radio wave intensity light emitting unit
214: expected value light emitting unit
216: display
218: radio wave button
222: router information transmitting unit
224: radio wave intensity transmitting unit
232: indication information receiving unit
234: indication process executing unit
252: expected value receiving unit
254: radio wave intensity acquiring unit
260: indication process executing unit
262: map data receiving unit
270: instruction accepting unit
272: instruction accepting unit
300: expected value managing apparatus
302: router information receiving unit
304: positional information acquiring unit
306: subscription information acquiring unit
308: expected value acquiring unit
310: map data referring unit
312: radio wave intensity receiving unit
314: radio wave intensity comparing unit
316: indication information transmitting unit
352: expected value transmitting unit
400: communication terminal
402: display
412: incoming radio wave intensity indication object
414: expected value indication object
416: data display column
422: positional information transmitting unit
424: radio wave intensity transmitting unit
432: indication information receiving unit
434: indication process executing unit
452: expected value receiving unit
454: radio wave intensity acquiring unit
460: indication process executing unit
462: map data receiving unit
470: instruction accepting unit
472: instruction accepting unit

What is claimed is:

1. A radio wave status indicating apparatus comprising:
a radio wave intensity receiving unit that receives, from a communication apparatus, incoming radio wave intensity of the communication apparatus;
a positional information acquiring unit that acquires positional information indicating a position of the communication apparatus;
an expected value acquiring unit that acquires an expected value of incoming radio wave intensity at a position indicated by the positional information;
a radio wave intensity comparing unit that compares the incoming radio wave intensity received by the radio wave intensity receiving unit with the expected value acquired by the expected value acquiring unit; and
an indication information transmitting unit that transmits indication information based on a result of comparison by the radio wave intensity comparing unit to at least one of the communication apparatus and a communication terminal pre-registered in the communication apparatus, wherein
the indication information transmitting unit transmits the indication information when incoming radio wave status of the communication apparatus has changed due to at least one of addition and removal of a wireless base station.

2. The radio wave status indicating apparatus according to claim 1, wherein the indication information transmitting unit transmits the indication information indicating a difference between the incoming radio wave intensity and the expected value.

3. The radio wave status indicating apparatus according to claim 1, wherein the expected value acquiring unit acquires, from map data in which expected values of incoming radio wave intensity at respective ones among a plurality of points on a map are associated with the plurality of points, an expected value of incoming radio wave intensity corresponding to a position indicated by the positional information acquired by the positional information acquiring unit.

4. The radio wave status indicating apparatus according to claim 3, wherein, when the incoming radio wave intensity is lower than the expected value, the indication information transmitting unit transmits the indication information including arrangement-related information that is generated based on the map data and is related to arrangement of the communication apparatus.

5. The radio wave status indicating apparatus according to claim 1, wherein, when an address, included in subscription information of the communication apparatus, of a subscriber that has concluded a contract with a telecommunications carrier about the communication apparatus is within a wireless coverage area covered by a wireless base station with which the communication apparatus is in communication, the positional information acquiring unit acquires the address as positional information about the communication apparatus, and when the address is not within the wireless coverage area, the positional information acquiring unit acquires a wireless coverage area covered by the wireless base station as positional information about the communication apparatus.

6. A non-transitory computer-readable medium having recorded thereon a program that causes a computer to function as:
a radio wave intensity receiving unit that receives, from a communication apparatus, incoming radio wave intensity of the communication apparatus;

a positional information acquiring unit that acquires positional information indicating a position of the communication apparatus;

an expected value acquiring unit that acquires an expected value of incoming radio wave intensity at a position indicated by the positional information;

a radio wave intensity comparing unit that compares the incoming radio wave intensity received by the radio wave intensity receiving unit with the expected value acquired by the expected value acquiring unit; and an indication information transmitting unit that transmits indication information based on a result of comparison by the radio wave intensity comparing unit to at least one of the communication apparatus and a communication terminal pre-registered in the communication apparatus, wherein the indication information transmitting unit transmits the indication information when incoming radio wave status of the communication apparatus has changed due to at least one of addition and removal of a wireless base station.

7. A communication apparatus comprising:

a radio wave intensity acquiring unit that acquires incoming radio wave intensity;

an expected value acquiring unit that acquires an expected value of incoming radio wave intensity at a position of the communication apparatus;

an indication process executing unit that executes an indication process based on incoming radio wave intensity acquired by the radio wave intensity acquiring unit and an expected value acquired by the expected value acquiring unit;

a plurality of incoming radio wave intensity light emitting units arrayed in one row and respectively corresponding to a plurality of incoming radio wave intensity levels; and a plurality of expected value light emitting units arrayed in one row and respectively corresponding to a plurality of expected values of incoming radio wave intensity, wherein the plurality of incoming radio wave intensity light emitting units and the plurality of expected value light emitting units are arranged in parallel, and an incoming radio wave intensity light emitting unit and an expected value light emitting unit that are adjacent to each other correspond to the same incoming radio wave intensity level, and the indication process executing unit causes the plurality of incoming radio wave intensity light emitting units to emit light based on incoming radio wave intensity acquired by the radio wave intensity acquiring unit, and causes the plurality of expected value light emitting units to emit light based on an expected value acquired by the expected value acquiring unit.

8. The communication apparatus according to claim 7, wherein the indication process executing unit indicates incoming radio wave intensity acquired by the radio wave intensity acquiring unit and an expected value acquired by the expected value acquiring unit.

9. The communication apparatus according to claim 7, wherein the indication process executing unit indicates a difference between incoming radio wave intensity acquired by the radio wave intensity acquiring unit and an expected value acquired by the expected value acquiring unit.

10. The communication apparatus according to claim 7, further comprising a map data receiving unit that receives map data in which expected values of incoming radio wave intensity at respective ones among a plurality of points on a map are associated with the plurality of points, wherein when the incoming radio wave intensity is lower than the expected value, the indication process executing unit executes an indication process to indicate arrangement-related information that is generated based on the map data and is related to arrangement of the communication apparatus.

11. The communication apparatus according to claim 7, further comprising a plurality of light-emitting units that are arrayed in one row, wherein the indication process executing unit indicates the expected value by causing only a light-emitting unit that corresponds to the expected value acquired by the expected value acquiring unit to emit light continuously, and indicates the incoming radio wave intensity by causing, among the plurality of light-emitting units, a light-emitting unit that corresponds to incoming radio wave intensity acquired by the radio wave intensity acquiring unit and all light-emitting units that correspond to incoming radio wave intensity that is lower than the incoming radio wave intensity to emit light.

12. The communication apparatus according to claim 11, wherein the indication process executing unit makes a luminescent color for indicating the expected value different from a luminescent color for indicating the incoming radio wave intensity.

13. The communication apparatus according to claim 7, further comprising a plurality of incoming radio wave intensity light emitting units arrayed in one row and respectively corresponding to a plurality of incoming radio wave intensity levels, wherein the indication process executing unit changes incoming radio wave intensity levels to be allocated to respective ones among the plurality of incoming radio wave intensity light emitting units depending on the expected value acquired by the expected value acquiring unit.

14. A non-transitory computer-readable medium having recorded thereon a program that causes a computer to function as:

a radio wave intensity acquiring unit that acquires incoming radio wave intensity;

an expected value acquiring unit that acquires an expected value of incoming radio wave intensity at a position of the computer;

an indication process executing unit that executes an indication process based on incoming radio wave intensity acquired by the radio wave intensity acquiring unit and an expected value acquired by the expected value acquiring unit;

a plurality of incoming radio wave intensity light emitting units arrayed in one row and respectively corresponding to a plurality of incoming radio wave intensity levels; and a plurality of expected value light emitting units arrayed in one row and respectively corresponding to a plurality of expected values of incoming radio wave intensity, wherein the plurality of incoming radio wave intensity light emitting units and the plurality of expected value light emitting units are arranged in parallel, and an incoming radio wave intensity light emitting unit and an expected value light emitting unit that are adjacent to each other correspond to the same incoming radio wave intensity level, and the indication process executing unit causes the plurality of incoming radio wave intensity light emitting units to emit light based on incoming radio wave intensity acquired by the radio wave intensity acquiring unit, and causes the plurality of expected value light emitting units to emit light based on an expected value acquired by the expected value acquiring unit.

* * * * *